(12) United States Patent
Lee et al.

(10) Patent No.: US 12,219,468 B2
(45) Date of Patent: Feb. 4, 2025

(54) METHOD AND APPARATUS FOR MANAGING NETWORK SLICE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 306 days.

(21) Appl. No.: 17/716,709

(22) Filed: Apr. 8, 2022

(65) Prior Publication Data

US 2022/0330139 A1 Oct. 13, 2022

(30) Foreign Application Priority Data

Apr. 9, 2021 (KR) .......................... 10-2021-0046675

(51) Int. Cl.
*H04W 48/16* (2009.01)
*H04W 48/18* (2009.01)
*H04W 60/00* (2009.01)

(52) U.S. Cl.
CPC .......... *H04W 48/16* (2013.01); *H04W 48/18* (2013.01); *H04W 60/00* (2013.01)

(58) Field of Classification Search
CPC ...... H04W 48/16; H04W 48/18; H04W 60/00
See application file for complete search history.

(56) References Cited

U.S. PATENT DOCUMENTS 11,711,727 B1 * 7/2023 Gupta .................. H04W 76/11
370/329
11,943,306 B2 * 3/2024 Suh ....................... H04L 67/141
(Continued)

FOREIGN PATENT DOCUMENTS

EP          3 989 637 A1    4/2022
WO       2020/186145 A1    9/2020
(Continued)

OTHER PUBLICATIONS

Huawei et al., Updates of NSACF Procedure, S2-2102571, 3GPP TSG-WG SA2 Meeting #144E e-meeting, Elbonia, Apr. 6, 2021,sections 4.2.11.2-4.2.11.3.
(Continued)

*Primary Examiner* — Hai V Nguyen
(74) *Attorney, Agent, or Firm* — Jefferson IP Law, LLP

(57) ABSTRACT

A method performed by an access and mobility management function (AMF) in a wireless communication system is provided. The method includes transmitting, to a network slice admission control function (NSACF), a request message for a slice availability check including information regarding an access type of a user equipment (UE), based on a registration request of the UE for one or more single network slice selection assistance informations (S-NSSAIs), in case that the slice availability check is performed for the one or more S-NSSAIs, based on the access type of the UE at the NSACF, receiving a response message including information regarding a result of the slice availability check, from the NSACF, and transmitting a registration response for the one or more S-NSSAIs to the UE, based on the result of the slice availability check.

12 Claims, 12 Drawing Sheets

(56) References Cited

U.S. PATENT DOCUMENTS

| | | | | |
|---|---|---|---|---|
| 11,963,095 | B2* | 4/2024 | Gupta | H04W 60/06 |
| 2021/0368421 | A1* | 11/2021 | Venkataraman | H04W 60/06 |
| 2023/0051733 | A1* | 2/2023 | Shah | H04W 72/56 |
| 2023/0345353 | A1* | 10/2023 | Roy | H04W 60/04 |
| 2024/0031790 | A1* | 1/2024 | Poe | H04W 24/02 |
| 2024/0073802 | A1* | 2/2024 | Velev | H04W 48/18 |
| 2024/0147235 | A1* | 5/2024 | Velev | H04L 63/10 |

FOREIGN PATENT DOCUMENTS

| | | | |
|---|---|---|---|
| WO | 2020/250005 | A1 | 12/2020 |
| WO | 2021/054770 | A1 | 3/2021 |
| WO | 2021/063981 | A1 | 4/2021 |

OTHER PUBLICATIONS

International Search Report dated Jul. 12, 2022, issued in International Application No. PCT/KR2022/005157.
Ericsson et al., TS23.502 KI#1 Network Slice Admission Control Function (NSACF)—Result Update, S2-2102209, 3GPP TSG-SA WG2 Meeting #144E e-meeting, Apr. 6, 2021, Elbonia.
European Search Report dated Jul. 29, 2024, issued in European Application No. 22785031.0.

* cited by examiner

METHOD AND APPARATUS FOR MANAGING NETWORK SLICE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0046675, filed on Apr. 9, 2021, in the Korean Intellectual Property Office, the disclosure of which is incorporated by reference herein in its entirety.

BACKGROUND

1. Field

The disclosure relates to a method and an apparatus for managing a network slice in a wireless communication system or a mobile communication system. More particularly, the disclosure relates to a method performed by an access and mobility management function (AMF) for managing a network slice in a wireless communication system.

2. Description of Related Art

Considering the developments of the wireless communication from generation to generation, technologies for services for humans, such as voice, multimedia, and data, have been mainly developed. It is expected that connected devices that have explosively increased in number after the commercialization of $5^{th}$ generation (5G) communication systems are to be connected with communication networks. Examples of things connected to the networks may include vehicles, robots, drones, home appliances, displays, smart sensors installed in various infrastructures, construction machines, factory facilities, or the like. Mobile devices are predicted to evolve into various form factors, such as augmented reality (AR) glasses, virtual reality (VR) headsets, hologram devices, or the like. In a $6^{th}$ generation (6G) era, efforts to develop improved 6G communication systems have been made in order to provide a wide range of services by connecting hundreds of billions of devices and things. For these reasons, 6G communication systems are called the systems beyond the 5G communication.

6G communication systems, which are expected to be commercialized around the year of 2030, will have a peak data rate of tera (e.g., 1,000 gigabytes)-level bps and radio latency less than 100 microseconds (μsec). For example, compared with the 5G communication systems, in the 6G communication systems, the data rate is 50 times faster, and the radio latency is reduced to $\frac{1}{10}$.

In order to achieve this high data rate and ultra-low latency, it is contemplated to implement the 6G communication systems in the terahertz (THz) band (for example, the 95 gigahertz (95 GHz) to 3 THz band). In the THz band, due to more severe pathloss and atmospheric absorption than in the millimeter wave (mmWave) band introduced in the 5G, it is anticipated that the importance of techniques for ensuring a signal transmission distance, i.e., coverage, will increase. As examples of the main techniques for securing the coverage, it is needed to develop radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multi-antenna transmission techniques, such as large scale antennas. In addition, new techniques, such as metamaterial-based lenses and antennas, a high dimensional spatial multiplexing technique using the orbital angular momentum (OAM), the reconfigurable intelligent surface (RIS), and the like are discussed to improve the coverage of THz-band signals.

In addition, for improvement in frequency efficiency and the system network, the techniques have been developed for the 6G communication systems, such as a full duplex technique for enabling uplink transmission and downlink transmission to simultaneously use the same frequency resource at the same time, a network technique using a satellite, a high-altitude platform station (HAPS), or the like, in an integrated manner, a network architecture improvement technique for supporting mobile base stations, etc. and enabling optimization, automation, or the like, of network operations, a dynamic spectrum-sharing technique through collision avoidance based on prediction of spectrum usage, an artificial intelligence (AI)-based communication technique for realizing system optimization by using AI from a designing stage and internalizing an end-to-end AI support function, and a next-generation distributed-computing technique for realizing complex services beyond the limit of terminal calculation capacities by using ultra-high-performance communication and computing resources (mobile edge computing (MEC), clouds, or the like) over the network. Moreover, it has been continually attempted to further enhance the connectivity between devices, optimize networks, facilitate softwarization of network entities, and increase the openness of wireless communication, through designing of new protocols to be used in the 6G communication systems, materializing hardware-based security environments, and developing techniques related to developments of mechanisms for a safe use of data and a method of maintaining privacy.

With such research and development in the 6G communication systems, the next hyper-connected experience is expected to be realized through hyper-connectivity of the 6G communication systems that encompasses not only connection between things, but also connection between humans and things. More particularly, it is anticipated that it will be possible to provide services, such as truly immersive extended reality (XR), high-fidelity mobile holograms, digital replica, or the like, through the 6G communication systems. In addition, services, such as a remote surgery, industrial automation, and an emergency response, based on enhanced security and reliability, will be provided through the 6G communication systems and will be applied in a variety of fields, such as industries, medical services, automobiles, home appliances, or the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for managing a network slice session in a wireless communication system or a mobile communication system.

Additional aspects will be set forth in part in the description which follows and, in part, will be apparent from the description, or may be learned by practice of the presented embodiments.

In accordance with an aspect of the disclosure, a method performed by an access and mobility management function (AMF) in a wireless communication system is provided. The method includes transmitting, to a network slice admission control function (NSACF), a request message for a slice availability check including information regarding an access type of a user equipment (UE), based on a registration request of the UE for one or more single network slice selection assistance informations (S-NSSAIs), in case that the slice availability check is performed for the one or more S-NSSAIs, based on the access type of the UE at the NSACF, receiving a response message including information regarding a result of the slice availability check, from the NSACF, and transmitting a registration response for the one or more S-NSSAIs to the UE, based on the result of the slice availability check.

In accordance with another aspect of the disclosure, an AMF is provided. The AMF includes a transceiver, and at least one processor coupled with the transceiver and configured to transmit, to a NSACF, a request message for a slice availability check including information regarding an access type of a UE, based on a registration request of the UE for one or more S-NSSAIs, in case that the slice availability check is performed for the one or more S-NSSAIs, based on the access type of the UE at the NSACF, receive a response message including information regarding a result of the slice availability check, from the NSACF, and transmit a registration response for the one or more S-NSSAIs to the UE, based on the result of the slice availability check.

In accordance with another aspect of the disclosure, a NSACF is provided. The NSACF includes a transceiver, and at least one processor coupled with the transceiver and configured to receive, from an AMF, a request message for a slice availability check including information regarding an access type of a UE, based on a registration request of the UE for one or more S-NSSAIs, perform the slice availability check for the one or more S-NSSAIs, based on the access type of the UE, and transmit a response message including information regarding a result of the slice availability check to the AMF, wherein a registration response for the one or more S-NSSAIs is transmitted from the AMF to the UE, based on the result of the slice availability check.

In accordance with another aspect of the disclosure, a UE is provided. The UE includes a transceiver, and at least on processor coupled with the transceiver and configured to transmit a registration request for one or more S-NSSAIs, and in case that a slice availability check for the one or more S-NSSAIs is performed at a NSACF, based on a request message for a slice availability check including information regarding an access type of the UE, and a registration response for the one or more S-NSSAIs including information regarding a result of the slice availability check is received at an AMF, receive a registration response for the one or more S-NSSAIs from the AMF, based on the result of the slice availability check.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
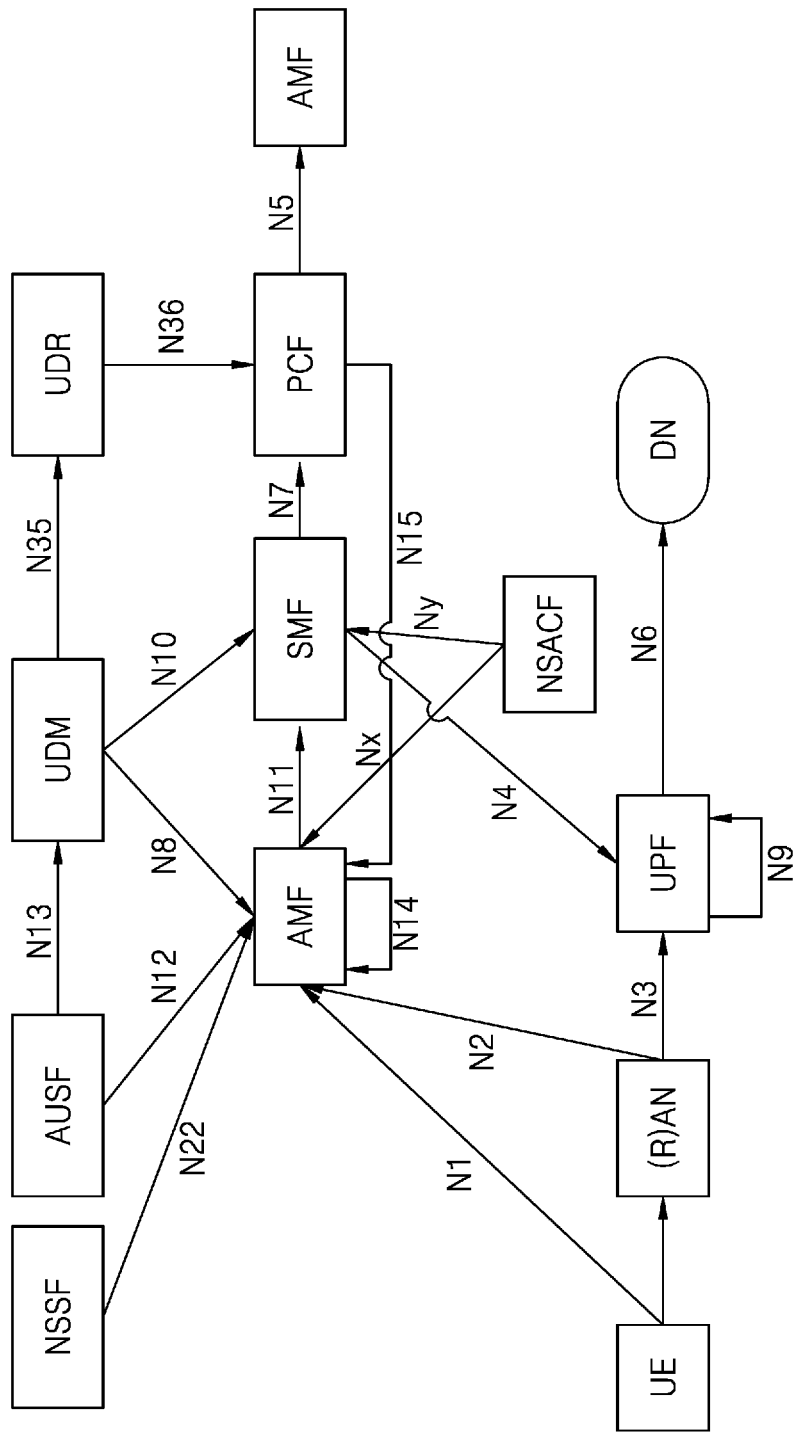
FIG. 1 is a diagram of a structure of a mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art, will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

The advantages and features of the disclosure and methods of achieving them will become apparent with reference to embodiments of the disclosure described below along with the attached drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Like numbers refer to like elements throughout the specification.

The disclosure discloses a method and an apparatus for providing a network slice (or network slicing) in a wireless communication system. More particularly, in this disclosure, a technique for managing network slice information in a wireless communication system configured to provide a network slice function is described. In addition, a mutual synchronization technique between a wireless communication system and a terminal is described.

In the description below, the term indicating a signal, the term indicating a channel, the term indicating control information, the term indicating network entities, the term indicating a component of an apparatus, and the like are exemplified for convenience of description. Accordingly, the disclosure is not limited to the terms described below, and other terms that refer to objects having equivalent technical meanings can be used.

In addition, various embodiments of the disclosure are described by using the terms used in some communication standards (for example, the $3^{rd}$ generation partnership project (3GPP)), but the terms are only examples for description. The various embodiments of the disclosure may be easily modified and applied to other communication systems.

In the 3GPP standards, an architecture and a procedure of a $5^{th}$-generation (5G) network system is standardized. An operator of mobile communication can provide various services in the 5G network. In order to provide each service, the operator of mobile communication may need to satisfy different service requirements (e.g., a latency, a communication range, a data rate, a bandwidth, the reliability, or the like) for respective services. To this end, the operator of mobile communication may configure network slices and may assign network resources appropriate for specific services with respect the network slices or sets of the network slices, respectively. A network resource may denote a network function (NF) or assignment of a logical resource provided by the NF or assignment of a wireless resource by a base station.

For example, the operator of mobile communication may configure a network slice A to provide mobile broadband service, configure a network slice B to provide vehicle communication service, and configure a network slice C to provide Internet of Things (IoT) service. In other words, in the 5G network, a corresponding service may be efficiently provided to a terminal through a network slice specialized for the characteristics of each service.

FIG. 1 is a diagram of a structure of a mobile communication system according to an embodiment of the disclosure.

Referring to FIG. 1, a 5G system (5GS) may include a terminal UE, a base station (R)AN, and a 5G core network (5GC).

The 5GC may include an access and mobility management function (AMF), a session management function (SMF), a user plane function (UPF), a policy content function (PCF), unified data management (UDM), a network slice selection function (NSSF), a network slice admission control function (NSACF), an authentication server function (AUSF), a unified data repository (UDR), or the like. The terminal (UE) may access the 5GC through the base station ((R)AN). Hereinafter, the UE may refer to the terminal, and the (R)AN may refer to the base station. In addition, the 5GC may further include an application function (AF) and a data network (DN).

According to an embodiment of the disclosure, an AMF may be an NF for managing wireless network access and mobility of a UE.

An SMF may be an NF for managing a session with respect to a UE, and information of the session may include quality of service (QoS) information, charging information, and packet processing information.

A UPF may be an NF for processing user traffic (e.g., a user plane traffic) and may be controlled by the SMF.

A PCF may be an NF for managing an operator policy (a public land mobile network (PLMN) policy) for providing a service in a wireless communication system. Additionally, the PCF may be divided into a PCF in charge of an access and mobility (AM) policy and a UE policy and a PCF in charge of a session management (SM) policy. The PCF in charge of the AM/UE policy and the PCF in charge of the SM policy may be the NFs logically or physically divided or may be a single logical or physical NF.

A UDM may be an NF for storing and managing UE subscription information.

A UDR may be an NF or a database (DB) for storing and managing data. The UDR may store UE subscription information and may provide the UE subscription information to the UDM. In addition, the UDR may store operator policy information and provide the operator policy information to the PCF.

An NSSF may be an NF for selecting network slice instances for providing a service to a UE or determining network slice selection assistance information (NSSAI).

An NSACF may be an NF for managing network slice use situations (for example, the number of registered UEs, the number of established sessions, or the like, per network slice) and determining whether or not to allow UE registration and session establishment.

An AUSF may be an NF for performing a function for supporting authentication for 3GPP access and non-3GPP (N3GPP) access.

An AF may be an NF for providing a function for a service according to the disclosure.

A DN may refer to a data network for providing an operator service, the Internet access, or a $3^{rd}$ party service.

Figure 2:
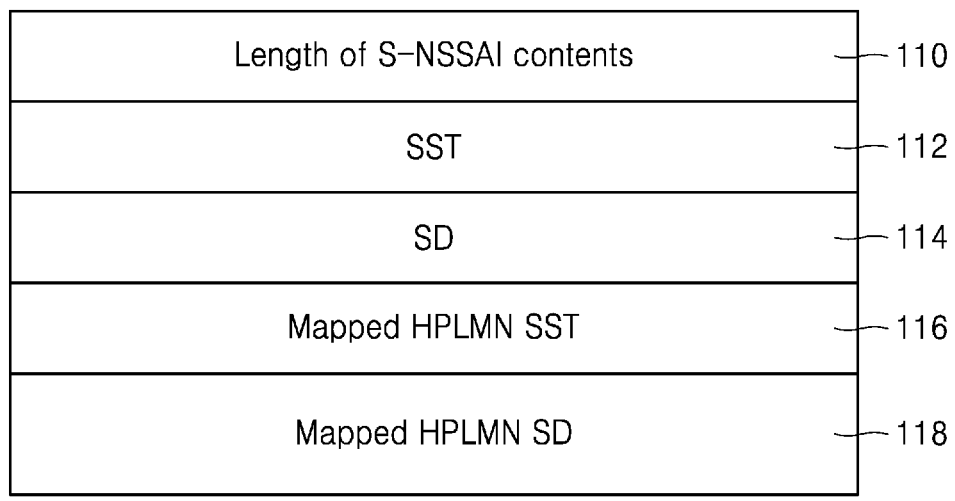
FIG. 2 is a diagram of a configuration of an information element (IE) of a network slice according to an embodiment of the disclosure.

FIG. 2 is a diagram of a configuration of an information element (IE) of a network slice according to an embodiment of the disclosure.

Referring to FIG. 2, as an identifier of a network slice, single-NSSAI (S-NSSAI), defined in the 3GPP, may be used. FIG. 2 shows an example of a configuration of an S-NSSAI IE. One S-NSSAI may include at least one of a slice/service type (SST) 116 used in a home PLMN (HPLMN), a slice differentiator (SD) 118 used in the HPLMN, an SST 112 used in a serving PLMN, or a SD 114 used in the serving PLMN. In addition, the S-NSSAI IE may further include a field 110 indicating a length of a content included in the S-NSSAI IE.

In a non-roaming condition, the SST 112 used in the serving PLMN may be the same as the SST 116 used in the HPLMN, and the SD 114 used in the serving PLMN may be the same as the SD 118 used in the HPLMN.

In a roaming condition, the SST 112 used in the serving PLMN may be an SST used in a visited PLMN (VPLMN), and the SD 114 used in the serving PLMN may be an SD used in the VPLMN.

Each of SSTs and each of SDs included in one S-NSSAI may have a value or may not have a value according to a condition.

The NSSAI may include one or more S-NSSAIs. Examples of the NSSAI may include configured NSSAI (or configured S-NSSAIs) stored in a UE, requested NSSAI (or requested S-NSSAIs) requested by the UE, allowed NSSAI (or allowed-S-NSSAIs) allowed to be used by the UE, rejected NSSAI (or rejected S-NSSAIs) rejected to be used by the UE, pending NSSAI (or pending S-NSSAIs) pending to be determined with respect to an availability (approval or rejection) for the UE, subscribed NSSAI stored in the UDM as the UE subscription information, or the like. However, the NSSAI is not limited thereto.

The disclosure provides an example of a method of managing the number of established sessions per network slice.

The NSACF may store information about the maximum number of sessions per network slice (identifiable via S-NSSAI) which is subject to network slice admission control (NSAC) (the S-NSSAI subject to the NSAC). The S-NSSAI, which is subject to the NSAC, may include information about whether or not a corresponding slice is subject to the control of the maximum number of UEs and information about whether or not the corresponding slice is subject to the control of the maximum number of sessions. When a specific slice is subject to the NSAC (or a specific slice is subject to the NSAC associated with a control of the maximum number of sessions), the NSACF may receive information about the maximum number of sessions per slice with respect to the corresponding slice, from other 5G NFs (for example, the AMF, the SMF, the PCF, the UDM, the UDR, or the like), and store the information. Alternatively, the NSACF may be configured with the information about the maximum number of sessions per slice through OAM (O&M).

The NSACF may control the number of currently established sessions per slice. The controlling of the number of currently established sessions may include adding the number of currently established sessions by one or more than one, whenever a new session is established. Here, the NSACF may control the number of currently established sessions not to exceed the maximum number of sessions. In addition, the controlling of the number of currently established sessions may include decreasing the number of currently established sessions by one or more than one, whenever an established session is released.

The NSACF may manage a list of PDU session IDs of (a) PDU sessions(s) established in association with a network slice. The NSACF may manage the network slice, a UE ID (a list of UE IDs) of the PDU session(s) established in association with the network slice, and the list of PDU session IDs of the PDU session(s) established in association with the network slice. For example, the NSACF may identify one PDU session through a combination of the UE ID and the PDU session ID. Alternatively, the NSACF may manage a list of PDU session IDs established per UE indicated by a UE ID (per UE ID). One PDU session ID may be used as a unique session identifier in one UE. For example, different PDU sessions established by different UEs may use an identical PDU session ID, and thus, each PDU session may not be uniquely identified by using only the PDU session ID, in a network supporting a plurality of UEs. Thus, the NSACF may uniquely identify one PDU session by using the UE ID together with the PDU session ID.

In order to increase the number of currently established sessions, the NSACF may identify whether or not a PDU session indicated by a requested PDU session ID and a requested UE ID is already included in a list managed by the NSACF. When the PDU sessions is not included in the list managed by the NSACF, the NSACF may add the requested PDU session ID and UE ID in the list managed by the NSACF and may increase the number of currently established sessions.

The SMF may establish a PDU session of a network slice which is subject to the NSAC (S-NSSAI subject to the NSAC) (or a network slice subject to the NSAC associated with a control of the maximum number of sessions). The SMF may receive information about whether or not a specific network slice is subject to the NSAC from other 5G NFs (for example, the AMF, the PCF, the UDM, the UDR, the NSACF, or the like). Alternatively, the SMF may be configured with the information about whether or not a specific network slice is subject to the NSAC through OAM (O&M).

In order to proceed with establishing the PDU session of the network slice subject to the NSAC, the SMF may determine to identify whether or not a corresponding current network slice is available.

Based on the determination, the SMF may discover and select the NSACF taking charge of the NSAC associated with the maximum number of sessions of the corresponding network slice.

The SMF may transmit an NF (NSACF) discovery request message to an NRF. The NF (NSACF) discovery request message may include network slice information (S-NSSAI) and an indicator indicating that the NSACF (a target NF, i.e., a target NSACF) that is to be discovered has to provide the NSAC function associated with a control of the number of sessions. The NRF may search for the NSACF in compliance with the condition requested by the SMF. The NRF may transmit an NF (NSACF) discovery response message to the SMF. The NF (NSACF) discovery response message may include information about the NSACF discovered by the NRF.

As another method, the NSACF information may be configured in the SMF, and the SMF may use the configured NSACF information.

The SMF may transmit a control request message with respect to the maximum number of sessions to the NSACF received from the NRF or configured in the SMF.

For convenience of explanation, the disclosure is described based on the operation of the SMF. However, an embodiment of the disclosure may also be performed by the AMF.

Figure 3:
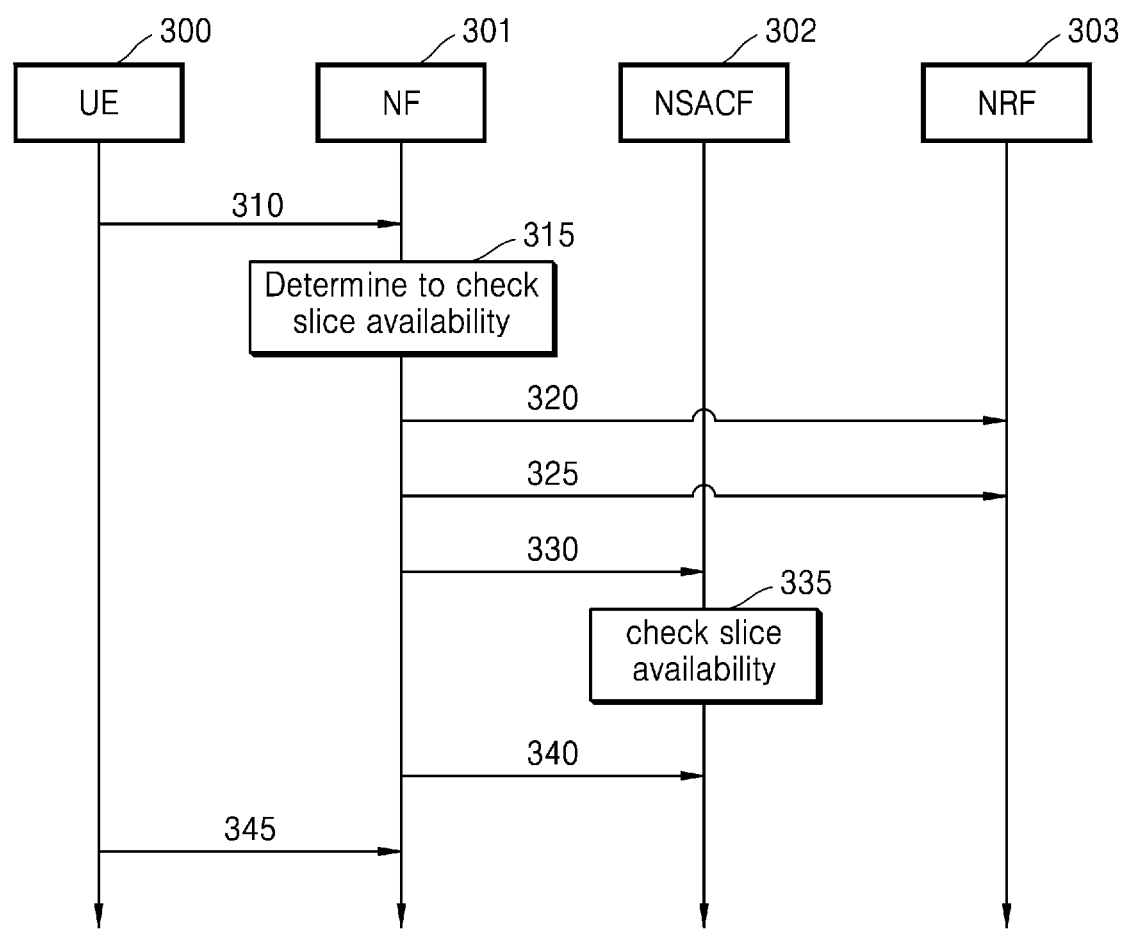
FIG. 3 is a diagram of a procedure of checking an availability according to a number of established sessions per network slice, according to an embodiment of the disclosure.

FIG. 3 is a diagram of a procedure of checking an availability according to a number of established sessions per network slice according to an embodiment of the disclosure.

Referring to FIG. 3, for convenience of explanation, an operation of an NF 301 is performed on the SMF. However, the NF 301 according to the disclosure may also be the AMF.

In operation S310, a UE 300 may transmit a message for requesting PDU session establishment to the NF 301 through the AMF. The message for requesting PDU session establishment may include at least one of a PDU session ID, a UE ID, or S-NSSAI.

In operation S315, the NF 301 may determine whether or not the S-NSSAI requested by the UE (or the S-NSSAI received from the AMF) is subject to NSAC (or NSAC associated with a control of the number of established sessions), based on at least one of a policy configured in the NF 301 or information received from other 5G NFs (for example, the AMF, the PCF, the UDM, the UDR, the NSACF, or the like).

When the function of the NF 301 is performed by the AMF, and the message for requesting PDU session establishment of operation S310 does not include the S-NSSAI, the NF 301 may select one S-NSSAI based on a policy configured in the NF 301. The NF 301 may determine whether or not the S-NSSAI requested by the UE (or the S-NSSAI selected by the AMF) is subject to the NSAC (or the NSAC associated with a control of the number of established sessions), based on at least one of the policy configured in the NF 301 or information received from other 5G NFs (for example, the PCF, the UDM, the UDR, the NSACF, or the like).

In operation S320, the NF 301 may transmit an NF discovery request message to an NRF 303. The NF discovery request message may include at least one of the S-NSSAI or information about a capability of a requested target NSACF. The capability of the required target NSACF may indicate that the target NASCF may have to support the function of the NSAC associated with a control of the number of sessions.

The NRF 303 may discover and select the required target NSACF.

In operation S325, the NRF 303 may transmit a response message for the NF discovery request to the NF 301. The response message for the NF discovery request may include information about the target NSACF selected by the NRF 303.

In operation S330, the NF 301 may transmit a slice availability request message to an NSACF 302. The NSACF 302 may be the NSACF selected based on the information received by the NF 301 from the NRF 303 in operation S325 and/or information configured in the NF 301. The NF 301 may store the information about the selected NSACF, and later may perform an interaction with the NSACF (for example, a procedure of releasing a PDU session, described with reference to FIG. 4), according to necessity.

The slice availability request message may include information for uniquely identifying one PDU session. For example, the slice availability request message may include a PDU session ID and a UE ID. In addition, the slice availability request message may include S-NSSAI.

In operation S335, the NSACF 302 may identify the number of established sessions of a network slice identified by using the S-NSSAI. The NSACF 302 may identify whether or not a PDU session indicated by the PDU session ID and the UE ID that are received is already included in a list managed by the NSACF 302. When the PDU session is not included in the list managed by the NSACF 302, the NSACF 302 may add the PDU session ID and the UE ID received in the list managed by the NSACF 302 and may increase the number of currently established sessions.

The NSACF 302 may control/manage the number of currently established sessions, based on information about the maximum number of sessions configured in the NSACF 302 or received from other 5G NFs (for example, the AMF, the SMF, the PCF, the UDM, the UDR, or the like). For example, the NSACF 302 may compare the number of currently established sessions, managed by the NSACF 302, with the maximum number of sessions, and may determine whether or not the number of currently established sessions is greater than the maximum number of sessions.

In operation S340, the NSACF 302 may transmit a slice availability response message to the NF 301.

When the PDU session indicated by the PDU session ID and the UE ID received in operation S330 is not included in the list managed by the NSACF 302, and the number of currently established sessions does not exceed the maximum number of sessions, the NSACF 302 may include, in the slice availability response message, information indicating that the S-NSSAI is available (information indicating that it is allowed to establish the PDU session for the S-NSSAI).

When the PDU session indicated by the PDU session ID and the UE ID received in operation S330 is not included in the list managed by the NSACF 302, but the number of currently established sessions exceeds the maximum number of sessions, the NSACF 302 may include, in the slice availability response message, information indicating that the S-NSSAI is non-available (information indicating that it is not allowed to establish the PDU session for the S-NSSAI).

When the PDU session indicated by the PDU session ID and the UE ID received in operation S330 is already included in the list managed by the NSACF 302, the NSACF 302 may include, in the slice availability response message, information indicating that the PDU session requested in operation S330 is already counted or information indicating that the S-NSSAI is available (information indicating it is allowed to establish the PDU session for the S-NSSAI).

In operation S345, the NF 301 may transmit a PDU session establishment response message to the UE 300.

When the NF 301 receives the information indicating that the S-NSSAI is available (the information indicating that it is allowed to establish the PDU session for the S-NSSAI) or the information indicating that the requested PDU session is already counted from the NSACF 302 in operation S340, the NF 301 may determine that a corresponding network slice is available. Accordingly, the NF 301 may proceed with establishing the PDU session. When the establishment of the PDU session is successfully performed, the NF 301 may transmit a PDU session establishment admission message to the UE 300 in operation S345.

When the NF 301 receives the information indicating that the S-NSSAI is not available (the information indicating that it is not allowed to establish the PDU session for the S-NSSAI) from the NSACF 302 in operation S340, the NF 301 may determine that a corresponding network slice is not currently available. Accordingly, the NF 301 may not proceed with establishing the PDU session and may determine to reject the establishment of the PDU session. The NF 301 may transmit a PDU session establishment rejection message to the UE 300 in operation S345.

Figure 4:
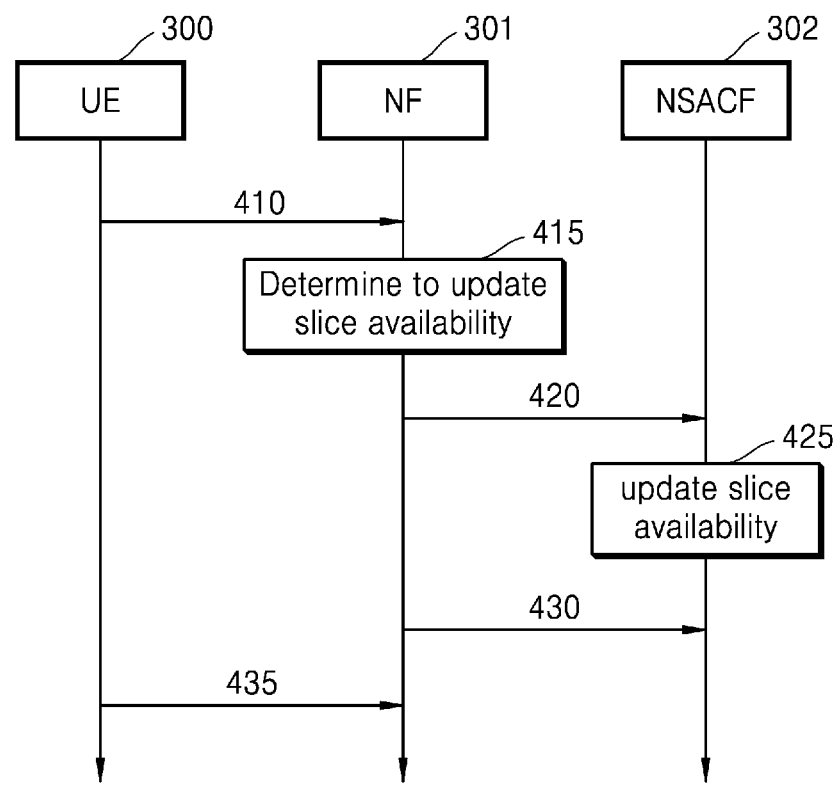
FIG. 4 is a diagram of a procedure for updating an availability or a non-availability according to a number of established sessions per network slice according to an embodiment of the disclosure.

FIG. 4 is a diagram of a procedure of updating an availability or a non-availability according to a number of established sessions per network slice according to an embodiment of the disclosure.

Referring to FIG. 4, for convenience of explanation, an operation of the NF 301 is performed on the SMF. However, the NF 301 according to the disclosure may also be the AMF.

In operation S415, the NF 301 may determine to release the established PDU session. This determination may be based on a PDU session release request received from the UE 300 in operation S410 or a request (a PDU session release request, an SM policy termination request, or the like) received from other 5G NFs (for example, the AMF, the PCF, the UDM, the UDR, or the like).

The NF 301 may determine whether or not the S-NSSAI associated with the corresponding PDU session is a network slice subject to NSAC (or subject to NSAC associated with a control of the number of sessions), according to the method described in this disclosure.

When the S-NSSAI associated with the corresponding PDU session is the network slice subject to the NSAC, the NF 301 may trigger operation S420.

In operation S420, the NF 301 may transmit a slice availability update request message to the NSACF 302. The slice availability update request message may include information for uniquely identifying a PDU session which is subject to be released. For example, the information may include a PDU session ID and a UE ID. In addition, the slice availability update request message may include the S-NSSAI.

In operation S425, the NSACF 302 may update the number of established sessions of the network slice identified by using the S-NSSAI. The NSACF 302 may identify whether or not the PDU session indicated by the received PDU session ID and UE ID is already included in a list managed by the NSACF 302. When the PDU session is included in the list managed by the NSACF 302, the NSACF 302 may delete the received PDU session ID and UE ID in the list managed by the NSACF 302 and may decrease the number of currently established sessions.

In operation S430, the NSACF 302 may transmit a slice availability update response message to the NF 301. The slice availability update response message may include information about a result associated with an update of the number of established sessions of the network slice (for example, a success or a failure).

The NF 301 may proceed with releasing the PDU session.

When the releasing of the PDU session is started by the request of the UE 300 (operation S410), the NF 301 may transmit a PDU session release message to the UE 300 in operation S435.

Figure 5:
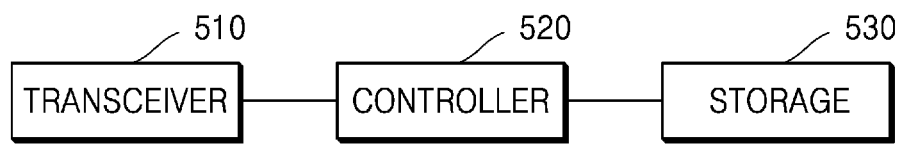
FIG. 5 is a diagram of a structure of a terminal according to an embodiment of the disclosure.

FIG. 5 is a diagram of a structure of a UE according to an embodiment of the disclosure.

Referring to FIG. 5, the UE may include a transceiver 510, a controller 520, and a storage 530. In the disclosure, the controller 520 may be defined as a circuit, an application-specific integrated circuit, or at least one processor. However, components of the UE are not limited to the examples described above.

The transceiver 510 may exchange signals with other network entities. For example, the transceiver 510 may receive system information from the network entities and may receive a synchronization signal or a reference signal therefrom.

The controller 520 may control overall operations of the UE according to an embodiment of the disclosure.

The storage 530 may store at least one of information transmitted or received via the transceiver 510 or information generated using the controller 520.

Figure 6:
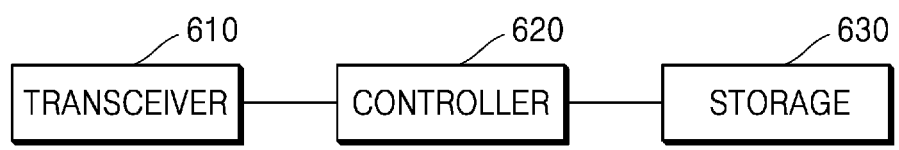
FIG. 6 is a diagram of a structure of a network entity according to an embodiment of the disclosure.

FIG. 6 is a diagram of a structure of a network entity according to an embodiment of the disclosure.

Referring to FIG. 6, the network entity may include a transceiver 610, a controller 620, and a storage 630. In the disclosure, the controller 620 may be defined as a circuit, an application-specific integrated circuit, or at least one processor. However, components of the network entity are not limited to the examples described above.

The transceiver 610 may exchange signals with other network entities. The transceiver 610 may receive, for example, a registration request message from a UE.

The controller 620 may control general operations of the network entity or an NF according to an embodiment of the disclosure.

The storage 630 may store at least one of information transmitted or received via the transceiver 610 or information generated using the controller 620.

Figure 7:
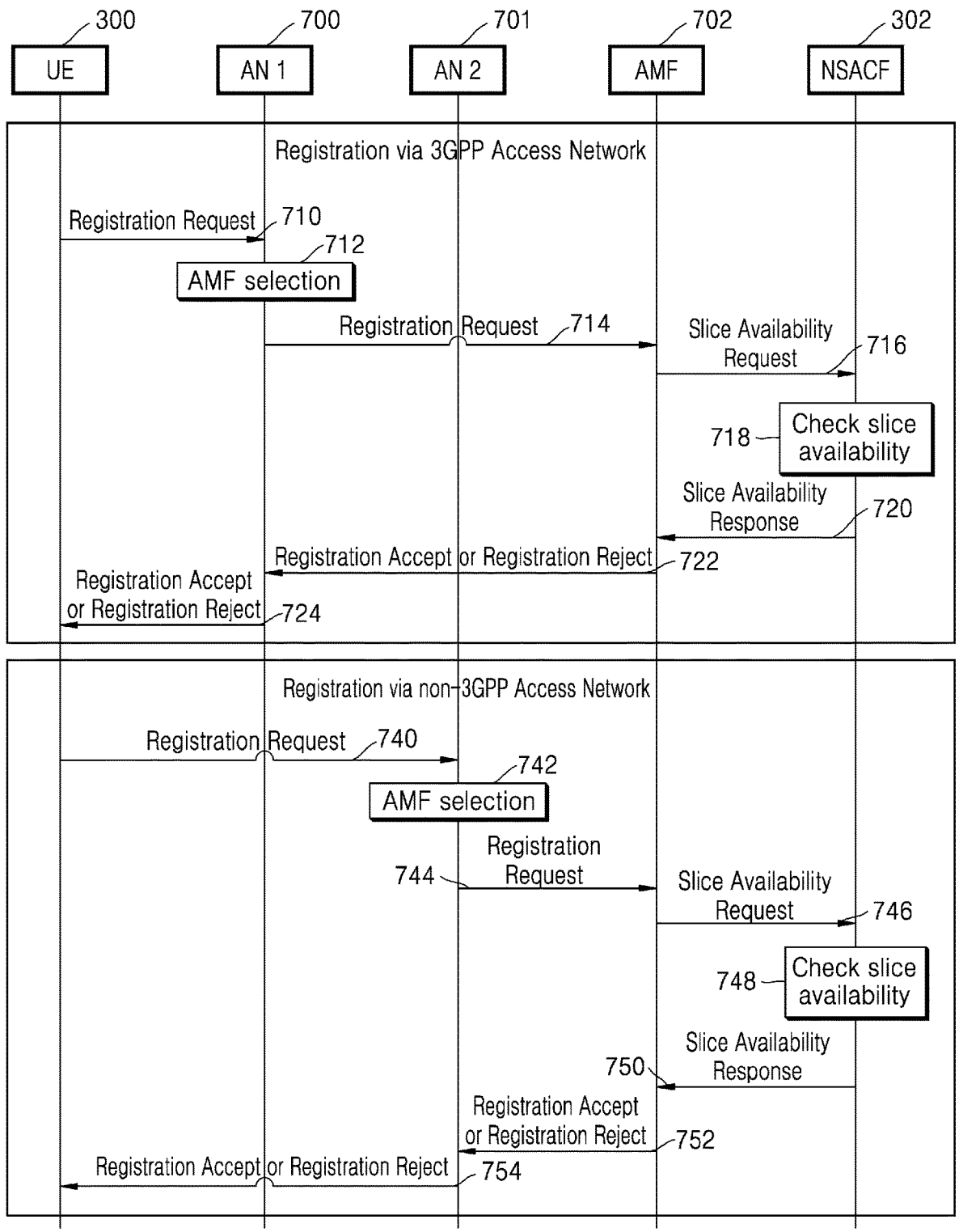
FIG. 7 is a diagram illustrating a terminal registration procedure according to an embodiment of the disclosure.

FIG. 7 is a diagram illustrating a UE registration procedure according to an embodiment of the disclosure.

Referring to FIG. 7, the UE 300 according to an embodiment of the disclosure may perform a registration procedure with an AMF 702 by accessing a first (R)AN ((R)AN1) 700 and a second (R)AN ((R)AN2) 701.

The (R)AN1 700 may be an apparatus for supporting 3GPP access. The (R)AN2 701 may be an apparatus for supporting N3GPP access. The AMF 702 to which the (R)AN1 700 is connected may be the same apparatus as the AMF 702 to which the (R)AN2 701 is connected. However, it is only an embodiment of the disclosure. According to another embodiment of the disclosure, the (R)AN1 700 and the (R)AN2 701 may be connected to different AMFs from each other.

In operation S710, the UE 300 may transmit a registration request message by accessing the (R)AN1 700. The registration request message may include information about a requested slice (requested NSSAI, for example, S-NSSAI A) to be used by the UE 300.

In operation S712, according to an embodiment of the disclosure, the (R)AN1 700 receiving the registration request message may select an AMF to which to transmit a registration request, based on the requested NSSAI received from the UE 300. For example, the (R)AN1 700 may select an AMF that is capable of supporting the requested NSSAI.

In operation S714, the (R)AN1 700 may transmit the registration request message to the AMF 702 selected in operation S712. The AMF 702 may determine an allowed slice (allowed NSSAI), based on the requested slice (the requested NSSAI) of the UE, a subscribed slice of the UE (subscribed S-NSSAI), a network (an access type) accessed by the UE (a 3GPP access network), and an operator policy. For example, the AMF 702 may include the requested slice (for example, the S-NSSAI A) of the UE in the allowed slice (for example, the S-NSSAI A).

In operation S716, before the AMF 702 confirms to allow the allowed slice for the UE 300, the AMF 702 may check a slice availability with the NSACF 302 of the 5GC. To this end, the AMF 702 may transmit a slice availability request message to the NSACF 302. The slice availability request message may include at least one of information about the subject slice (for example, the S-NSSAI, the requested NSSAI, the allowed NSSAI, the subscribed S-NSSAI, or the like), information about a network accessed by the UE (for example, 3GPP access), information about a location of the UE (for example, TA, etc.), or UE information (for example, SUPI, 5G-GUTI, or the like).

In operation S718, the NSACF 302 may check a slice policy of the subject slice (for example, the S-NSSAI, the requested NSSAI, the allowed NSSAI, the subscribed S-NSSAI, or the like) received from the AMF 702 and the number of currently accessed UEs of the subject slice.

For example, the NSACF 302 may check whether or not a UE ID (for example, the SUPI, the 5G-GUTI, or the like)

is included in a UE ID list, managed by the NSACF 302 for monitoring the number of registered UEs of the S-NSSAI. Additionally, the NSACF 302 may check whether or not the access network information is included in the UE ID list, managed by the NSACF 302 for monitoring the number of registered UEs of the S-NSSAI. When the UE ID and/or the access network are/is not included in the UE ID list, the NSACF 302 may include the UE ID and/or the access information in the UE ID list and may increase the number of counted UEs.

In operation S720, the NSACF 302 may transmit a slice availability response message to the AMF 702. The slice availability response message may include at least one of the information about the subject slice (for example, the S-NSSAI, the requested NSSAI, the allowed NSSAI, the subscribed S-NSSAI, or the like) or whether or not the subject slice is available (for example, an indicator indicating an availability or a non-availability, a cause value, or the like).

The AMF 702 may confirm the allowed slice according to the slice availability or the slice non-availability received from the NSACF 302. For example, when the AMF 702 receives the availability of the slice (S-NSSAI) from the NSACF 302, the AMF 702 may include the slice (S-NSSAI) in the allowed slice. As another example, when the NSACF 302 transmits a message notifying the AMF 702 of the non-availability of the slice (S-NSSAI), the AMF 702 may not include the slice (S-NSSAI) in the allowed slice and may include the slice (S-NSSAI) in the rejected slice (rejected NSSAI).

In operation S722, the AMF 702 may transmit, to the UE 300, a response message (a registration accept or registration reject message) with respect to the registration request message received in operation S714. The registration accept message may include information about at least one of the allowed slice (the allowed NSSAI) or the rejected slice (the rejected NSSAI). When there is no slice available for the UE, the AMF 702 may transmit the registration reject message.

In operation S724, the (R)NA1 700 may transmit, to the UE 300, the registration accept or registration reject message received from the AMF 702.

In operation S740, the UE 300 may transmit the registration request message by accessing the (R)NA2 701. The registration request message may include information about a requested slice (requested NSSAI, for example, S-NSSAI A) to be used by the UE 300.

In operation S742, according to an embodiment of the disclosure, the (R)AN2 701 receiving the registration request message may select an AMF to which to transmit a registration request, based on the requested NSSAI received from the UE 300 and/or the UE ID (e.g., 5G-GUTI, or the like) For example, the (R)AN2 701 may select an AMF which may be indicated by the UE ID (e.g., 5G-GUTI, or the like)

In operation S744, the (R)AN 701 may transmit the registration request message to the AMF 702 selected in operation S742. The AMF 702 may determine an allowed slice (allowed NSSAI), based on the requested slice (the requested NSSAI) of the UE, a subscribed slice of the UE (subscribed S-NSSAI), a UE access network (AN) (a N3GPP AN), and an operator policy. In addition, in determining the allowed slice, the AMF 120 may consider the allowed slice and/or the rejected slice, determined in operations S710 through S724. For example, the AMF 702 may include the requested slice (for example, the S-NSSAI A) of the UE in the allowed slice (for example, the S-NSSAI A).

In operation S746, before the AMF 702 confirms to allow the allowed slice for the UE 300, the AMF 702 may check a slice availability with the NSACF 302 of the 5GC. To this end, the AMF 702 may transmit a slice availability request message to the NSACF 302. The slice availability request message may include at least one of information about the subject slice (for example, the S-NSSAI, the requested NSSAI, the allowed NSSAI, the subscribed S-NSSAI, or the like), information about a network accessed by the UE (for example, N3GPP access), information about a location of the UE (for example, TA, or the like), or UE information (for example, SUPI, 5G-GUTI, or the like).

In operation S748, the NSACF 302 may check a slice policy of the subject slice (for example, the S-NSSAI, the requested NSSAI, the allowed NSSAI, the subscribed S-NSSAI, or the like) received from the AMF 702 and the number of currently accessed UEs of the subject slice.

For example, the NSACF 302 may check whether or not a UE ID (for example, the SUPI, the 5G-GUTI, or the like) is included in a UE ID list, managed by the NSACF 302 for monitoring the number of registered UEs of the S-NSSAI. Additionally, the NSACF 302 may check whether or not the AN information is included in the UE ID list, managed by the NSACF 302 for monitoring the number of registered UEs of the S-NSSAI. When the UE ID and/or the AN are/is not included in the UE ID list, the NSACF 302 may determine that the UE is already included in the number of registered UEs. Thus, the NSACF 302 may not increase the number of counted UEs.

For example, when the number of registered UEs is counted based on the number of UEs, the NSACF 302 may determine that the UE is already included in the number of registered UEs and may not increase the number of counted UEs, when the UE ID received in operation S746 is included in the UE ID list managed by the NSACF 302 (the UE ID is included in the UE ID list in operation S718). In this case, because the UE is already registered, information that the subject slice is available may be included in a message of operation S750.

Alternatively, when the number of registered UEs is counted based on the number of registered UEs, the NSACF 302 may determine that the UE is not included in the number of registered UEs, when the UE ID received in operation S746 is included in the UE ID list managed by the NSACF 302 (the UE ID is included in the UE ID list in operation S718), but the AN (non-3GPP access) received in operation S746 is not included in the UE ID list managed by the NSACF 302 (the 3GPP access is included in the UE ID list in operation S718). Accordingly, the NSACF 302 may include the AN in the UE ID list and may increase the number of counted UEs. In this case, when the number of current UEs exceeds the maximum number of UEs, the number of counted UEs may not be increased, and the AN may be included in the UE ID list. In addition, information that the subject slice is not available may be included in the message of operation S750.

In operation S750, the NSACF 302 may transmit a slice availability response message to the AMF 702. The slice availability response message may include at least one of the information about the subject slice (for example, the S-NSSAI, the requested NSSAI, the allowed NSSAI, the subscribed S-NSSAI, or the like) or whether or not the subject slice is available (for example, an indicator indicating an availability or a non-availability, a cause value, or the like).

The AMF 702 may confirm the allowed slice according to the slice availability or the slice non-availability received from the NSACF 302. For example, when the AMF 702 receives the availability of the slice (S-NSSAI) from the NSACF 302, the AMF 702 may include the slice (S-NSSAI) in the allowed slice. As another example, when the NSACF 302 transmits a message notifying the AMF 702 of the non-availability of the slice (S-NSSAI), the AMF 702 may not include the slice (S-NSSAI) in the allowed slice and may include the slice (S-NSSAI) in the rejected slice (rejected NSSAI).

In operation S752, the AMF 702 may transmit, to the UE 300, a response message (a registration accept or registration reject message) with respect to the registration request message received in operation S744. The registration accept message may include information about at least one of the allowed slice (the allowed NSSAI) or the rejected slice (the rejected NSSAI). When there is no slice available for the UE, the AMF 702 may transmit the registration reject message.

In operation S754, the (R)NA2 701 may transmit, to the UE 300, the registration accept or registration reject message received from the AMF 702.

According to an embodiment of the disclosure, the NSACF 302 may determine a slice availability according to registered UEs. Thus, even when the UE 300 requests the same slice (for example, the S-NSSAI A) in operations S710 and S740, the availability of the corresponding slice may vary according to execution time points of operations S718 and S748. For example, the NSACF 302 in operation S718 may determine that the corresponding slice (for example, the S-NSSAI A) is available, but the NSACF 302 in operation S748 may determine that the corresponding slice (for example, the S-NSSAI A) is not available. Accordingly, the AMF 702 may transmit, to the UE 300, the registration accept message by including the corresponding slice (for example, S-NSSAI A) in the allowed NSSAI, in operation S722. However, the AMF 702 may transmit, to the UE 300, the registration accept message by including the corresponding slice (for example, S-NSSAI A) in the rejected NSSAI, in operation S752.

Referring to FIG. 7, the registration procedure of the 3GPP AN and the registration procedure of the N3GPP AN are sequentially described, according to an embodiment of the disclosure. However, the registration procedure of the 3GPP AN may be performed after the registration procedure of the N3GPP AN.

Figure 8:
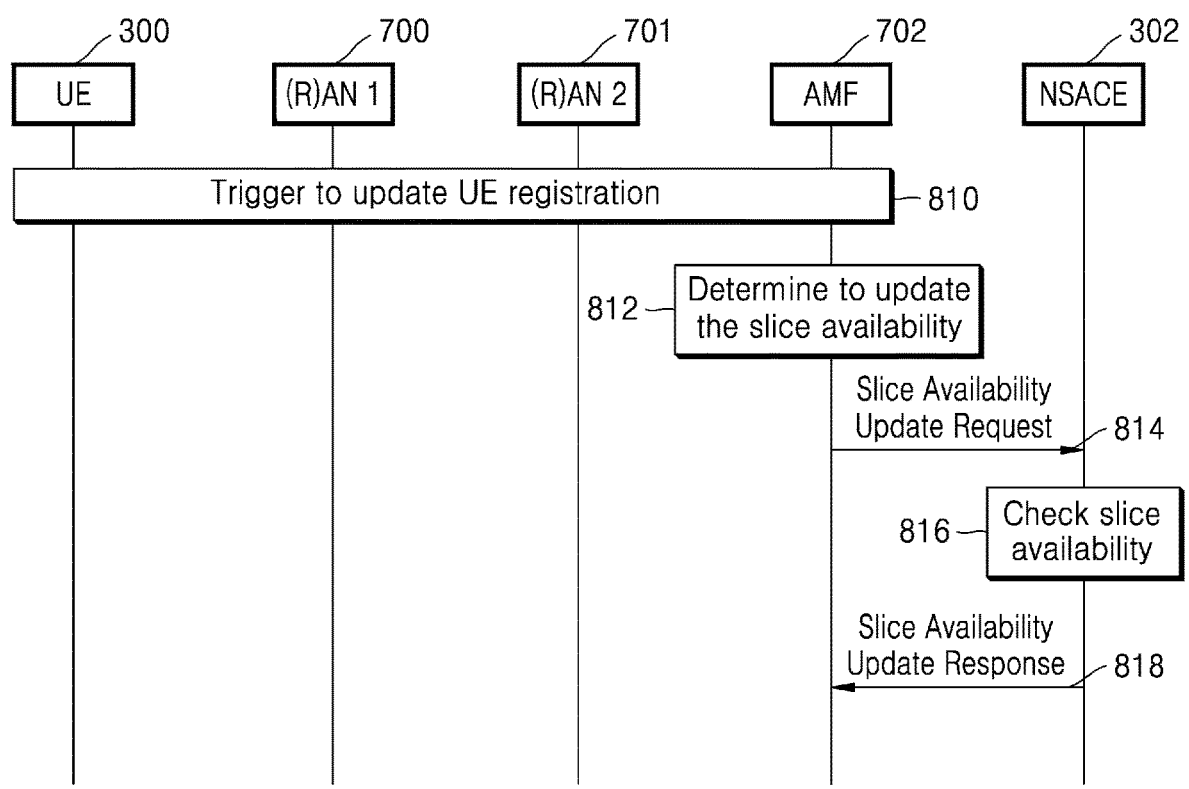
FIG. 8 is a diagram illustrating a procedure for decreasing a number of registered terminals according to an embodiment of the disclosure.

FIG. 8 is a diagram illustrating a procedure of decreasing a number of registered UEs according to an embodiment of the disclosure.

Referring to FIG. 8, in operation S810, the AMF 702 may determine to delete the S-NSSAI, provided to the UE 300 in the procedure described with respect to FIG. 7, from the allowed NSSAI.

In operation S812, the AMF 702 may determine whether or not the S-NSSAI determined to be deleted from the allowed NSSAI in operation S810 is subject to counting of the number of registered UEs (the S-NSSAI subject to NSAC). When the S-NSSAI determined to be deleted from the allowed NSSAI is subject to the counting of the number of registered UEs, the AMF 702 may determine to perform, with the NSACF 302, an update procedure of the number of registered UEs.

In operation S814, the AMF 702 may transmit a slice availability update request message to the NSACF 302. The slice availability update request message may include the S-NSSAI, a UE ID, and information about a current AN of a UE (for example, 3GPP, N3GPP, or the like). In addition, the slice availability update request message may include an indicator indicating that the number of registered UEs has to be decreased.

In operation S816, the NSACF 302 may update the number of currently accessed UEs of the received S-NSSAI. For example, when the number of registered UEs is counted based on the number of registered UEs, the NSACF 302 may check whether or not the UE ID and the AN received in operation S814 are included in a UE ID list managed by the NSACF 302. When the UE ID and the AN received in operation S814 are included in the UE ID list managed by the NSACF 302, the NSACF 302 may delete the UE ID and the AN from the UE ID list managed by the NSACF 302 and may decrease the number of registered UEs. For example, when a 3GPP AN and a N3GPP AN are simultaneously accessed by the same UE ID, the NSACF 302 may delete the AN received in operation S814 from the UE ID list managed by the NSACF 302.

Alternatively, when the number of registered UEs is counted based on the number of UEs, the NSACF 302 may check whether or not the UE ID and the AN received in operation S814 are included in the UE ID list managed by the NSACF 302. When the UE ID and the AN received in operation S814 are included in the UE ID list managed by the NSACF 302, the NSACF 302 may delete the corresponding AN from the UE ID list managed by the NFSAC 302. However, when different ANs are registered via the same UE ID, the NSACF 302 may not decrease the number of registered UEs and may intactly maintain the number of registered UEs. For example, when the same UE ID simultaneously accesses the 3GPP AN and the N3GPP AN, the NSACF 302 may delete the AN received in operation S 814 from the UE ID list managed by the NSACF 302, but the UE may still access the network through the other AN, and thus, the UE ID may not be deleted from the UE ID list, and the number of registered UEs may not be decreased and may be intactly maintained.

Figure 9:
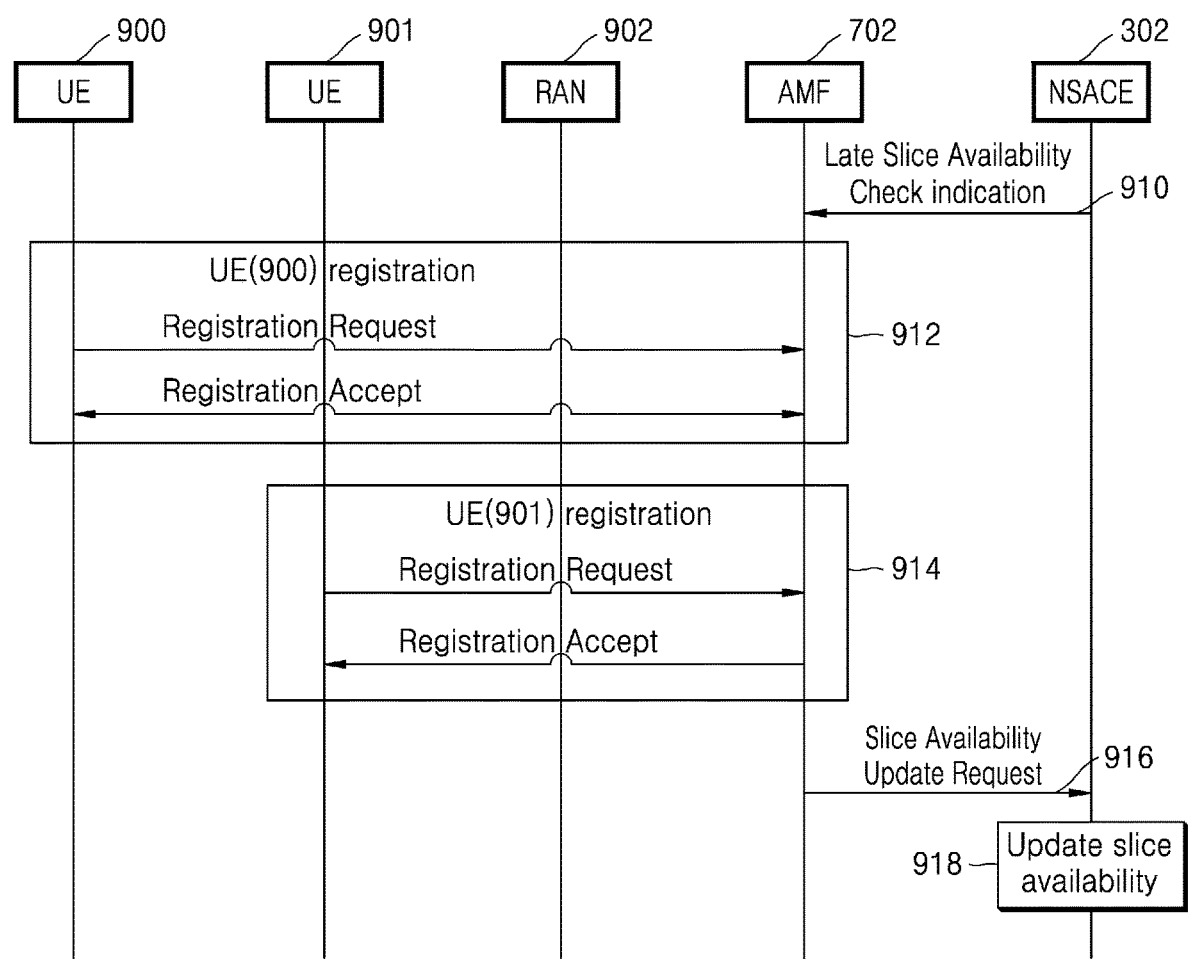
FIG. 9 is a diagram illustrating a bulk terminal registration update procedure according to an embodiment of the disclosure.

FIG. 9 is a diagram illustrating a bulk UE registration update procedure according to an embodiment of the disclosure.

Referring to FIG. 9, in operation S910, the NSACF 302 may transmit information including an indicator indicating that a check for a slice availability may be performed later (may not be needed to be performed early) to the AMF 702. For example, when the number of registered UEs that are currently accessed is significantly lower than the maximum number of registered UEs, the NSACF 302 may determine to transmit this information including the indicator to the AMF 702. The AMF 702 may store the indicator obtained from the information received from the NSACF 302.

In operation S912, the AMF 702 may process a registration procedure of a first UE 900 by accessing a RAN 902. During the registration procedure, the AMF 702 may omit the process of checking the slice availability, based on the indicator obtained in operation S910. For example, operations S716 through S720 of FIG. 7 may be determined to be performed after operation S724.

In operation S914, the AMF 702 may process a registration procedure of a second UE 901. During the registration procedure, the AMF 702 may omit the process of checking the slice availability, based on the indicator received in operation S910.

After the AMF 702 finishes operations S912 through S914, the AMF 702 may transmit, to the NSACF 302, a slice availability update request message, in order to update the registered UEs, in operation S916. The slice availability update request message may include at least one of S-NS- SAI, one or more registered UE IDs (a list of UE IDs), i.e., a UE ID of the first UE 900 and a UE ID of the second UE 901, or AN information of each UE.

In operation S918, the NSACF 302 may update the UE ID list managed by the NSACF 302 and the number of currently registered UEs, based on the information received in operation S916. For example, the NSACF 302 may add the UE ID of the first UE 900 and the UE ID of the second UE 901 in the UE ID list. In addition, the NSACF 702 may add the AN of the first UE 900 and the AN of the second UE 901 in the UE ID list. The NSACF 702 may increase the number of currently accessed UEs by the number of UEs on which the registration procedure is performed (2, according to the embodiment of the disclosure, described with respect to FIG. 9).

As another example, the slice availability update request message of operation S916 may include at least one of S-NSSAI, a registered UE ID, or information about a plurality of ANs accessed by a UE. The NSACF 302 may update the UE ID list managed by the NSACF 302 and the number of currently registered UEs, based on the information received in operation S916. For example, the NSACF 302 may add the UE ID in the UE ID list. In addition, the NSACF 302 may add the plurality of ANs (3GPP access and N3GPP access) of the UE in the UE ID list. The NSACF 302 may increase the number of currently accessed UEs by the number of ANs of the UE on which the registration procedure is performed (2, according to the embodiment of the disclosure, described with respect to FIG. 9).

Figure 10:
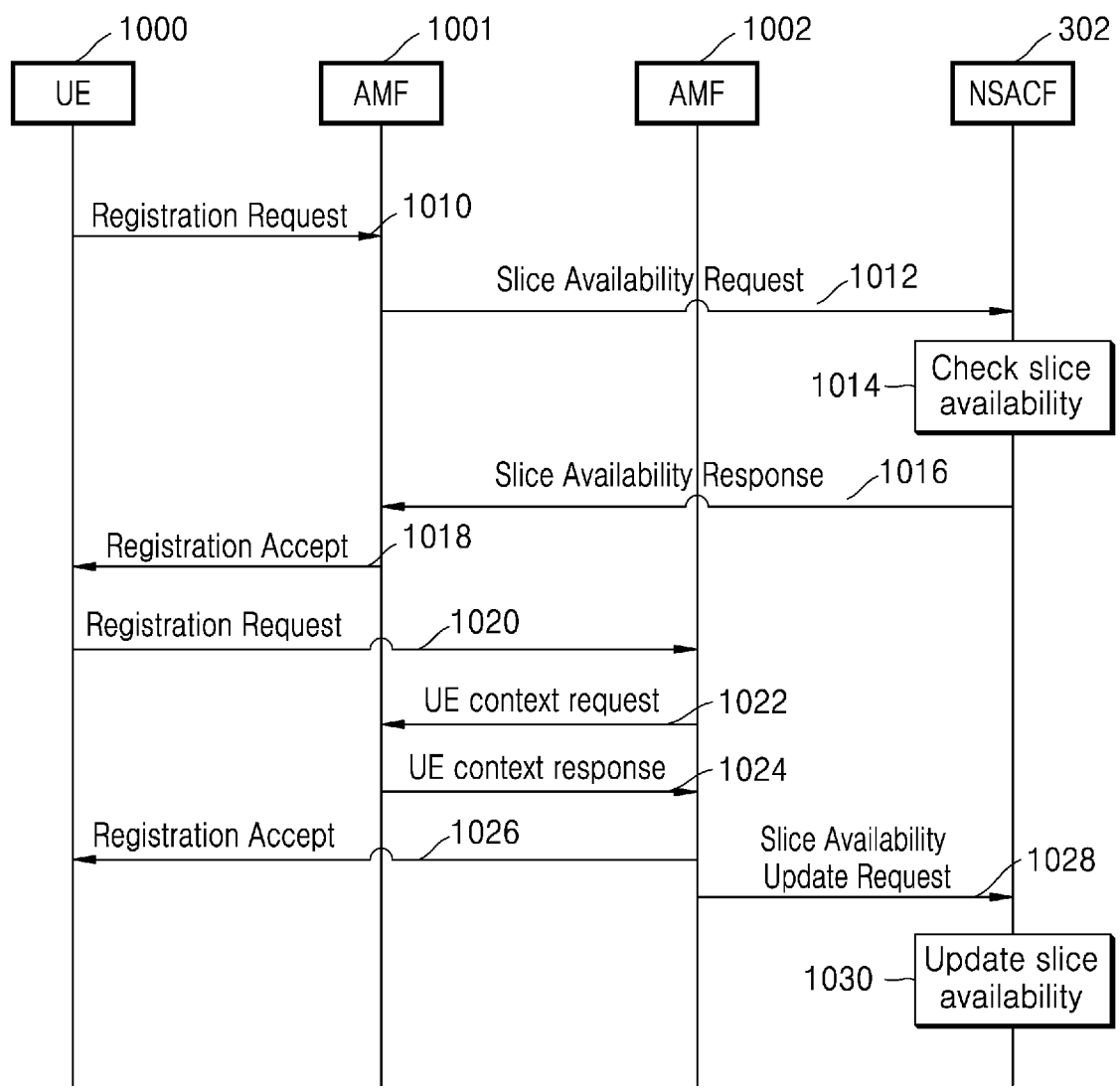
FIG. 10 is a diagram illustrating a procedure for updating a slice according to an embodiment of the disclosure.

FIG. 10 is a diagram illustrating a slice update procedure according to an embodiment of the disclosure.

Referring to FIG. 10, a UE 1000 may be registered in a network through operations S1010 through S1018, and the NSACF 302 may include the UE 1000 in the number of currently registered UEs, based on a request of a first AMF 1001. Operations S1010 through S1018 may correspond to the registration procedure described above with respect to FIGS. 7 and 8.

In operation S1020, the UE 1000 may transmit a registration request message to a second AMF 1002. The second AMF 1002 may identify an old AMF previously accessed by the UE 1000, that is, the first AMF 1001, based on a UE ID (5G-GUTI) included in the registration request message.

In operation S1022, the second AMF 1002 may request, from the first AMF 1001, a UE context of the UE 1000 identified by the UE ID (SUPI or 5G-GUTI).

In operation S1024, the first AMF 1001 may transmit the UE context of the UE 1000 to the second AMF 1002. The UE context may include first allowed NSSAI (old allowed NSSAI) assigned to the UE 1000 by the first AMF 1001 in operation S1018.

In operation S1026, the second AMF 1002 may assign second allowed NSSAI (new allowed NSSAI) to the UE 1000, and a registration accept message of operation S1026 may include the second allowed NSSAI.

The second AMF 1002 may compare the first allowed NSSAI received in operation S1024 with the second allowed NSSAI assigned by the second AMF 1002. When there is S-NSSAI, which is included in the first allowed NSSAI, but is not included in the second allowed NSSI, and the S-NSSAI is subject to NSAC, the second AMF 1002 may perform operation S1028. For example, the second AMF 1002 may determine that the UE 1000 previously used the S-NSSAI, but is not able to continually use the S-NSSAI. Accordingly, the second AMF 1002 may exclude the UE 1000 from a list of currently registered UEs for the S-NSSAI and may determine that it is needed to reduce the number of currently registered UEs.

In operation S1028, the second AMF 1002 may transmit a slice update request message to the NSACF 302. The slice update request message may include at least one of the S-NSSAI, the UE ID, an AN of the UE 1000, or an indicator indicating that it is needed to reduce the number of registered UEs.

In operation S1030, the NSACF 302 may update the number of currently registered UEs, based on the information received in operation S1028. For example, the NSACF 302 may determine that the UE 1000 may not further use the S-NSSAI, may delete the corresponding UE ID from the list of current registered UE IDs for the S-NSSAI, and may reduce the number of current UEs by one.

Figure 11:
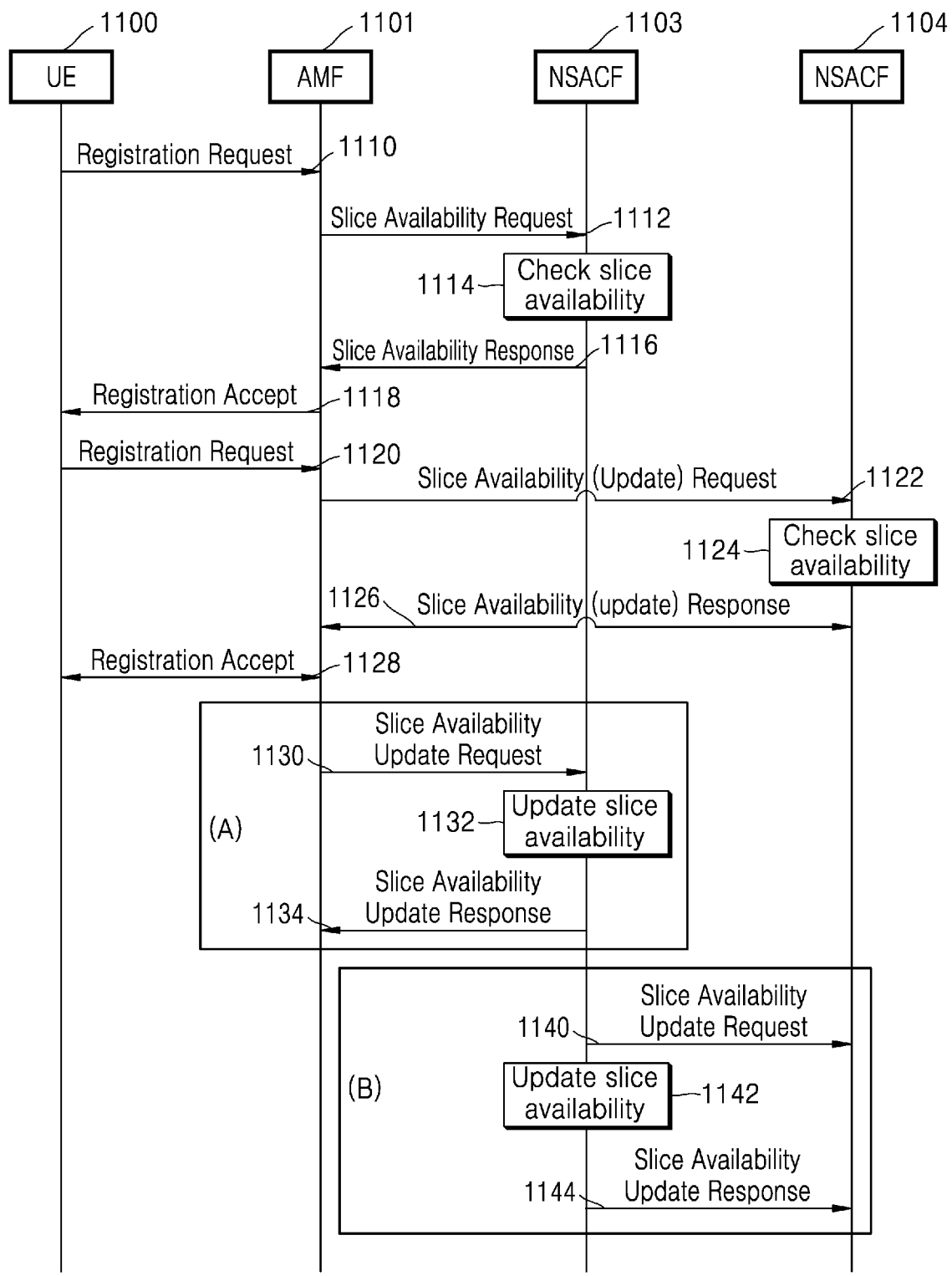
FIG. 11 is a diagram illustrating a method of managing a number of registered terminals according to an embodiment of the disclosure.

FIG. 11 is a diagram illustrating a method of managing a number of registered UEs according to an embodiment of the disclosure.

Referring to FIG. 11, according to an embodiment of the disclosure, there may be a plurality of NSACFs, namely, a first NSACF 1103 and a second NSACF 1104. For example, the first NSACF 1103 and the second NSACF 1104 may take charge of different serving areas. The serving areas may be divided by a list of TAIs.

Referring to FIG. 11, a UE 1100 may be registered in a network through operations S1110 through S1118, and the NSACF may include the UE 1100 in the number of currently registered UEs, based on a request of an AMF 1101. Descriptions about operations S1112 through S1116 are similar to those of FIGS. 7 and 8. The AMF 1101 may select an NSACF performing operations S1112 through S1116, based on at least one of a current location (a TAI of a UE) of the UE 1100, a registration area assigned to the UE 1100, or a serving area of the NSACF. Information about the registration area may include a list of TAIs and may include a current TAI of the UE 1100. The information about the registration area may be transmitted to the UE 1100 by being included in a registration accept message of operation S1118. For example, the AMF 1101 may select the NSACF, in a serving area (a list of TAIs) of which the current TAI of the UE 1100 is included. Alternatively, the AMF 1101 may select the NSACF, in a serving area (a list of TAIs) of which the registration area (the list of TAIs) of the UE 1100 is included. In addition, the registration accept message may include S-NSSAI. The S-NSSAI may be available for the UE 1100, and the S-NSSAI may be subject to NSAC so as counted in the number of registered UEs by the first NSACF 1103.

In operation S1120, the UE 1100 may transmit a registration request message to the AMF 1101, for example, due to a movement/a change of location, or the like. In operation S1120, the location (the TAI) of the UE 1100 may be a TAI that is not included in the registration area received in operation S1118. The registration request message may include S-NSSAI. The S-NSSAI may be the S-NSSAI included in the registration accept message of operation S1118.

In operation S1122, the AMF 1101 may determine that the received S-NSSAI is subject to the NSAC. In addition, the AMF 1101 may determine whether or not the location (TAI) of the current UE 1100 is included in a serving area of the first NSACF 1103. When the current location (TAI) of the UE 1100 is not included in the serving area of the first NSACF 1103, the AMF 1101 may select the NSACF performing operations S1122 through S1126, based on at least one of the current location of the UE 1100 (the TAI of the UE 1100), a registration area newly assigned to the UE 1100, or a serving area of the NSACF. Information about the new registration area may be transmitted to the UE 1100 by being included in a registration accept message of operation S1128. For example, the AMF 1101 may select the NSACF, in a serving area (a list of TAIs) of which the current TAI of the UE 1100 is included. Alternatively, the AMF 1101 may select the NSACF, in a serving area (a list of TAIs) of which the registration area (the list of TAIs) of the UE 1100 is included. Here, the second NSACF 1104 selected in operation S1122 may be different from the first NSACF 1103 selected in operation S1112. For example, when the serving area of the previous first NSACF 1103 does not include the current location (the TAI) of the UE 1100, due to a change of the location (the TAI) of the UE, the UE 1100 may require a change to another NSACF (e.g., the second NSACF 1104) including the current location (the TAI) of the UE 1100. The AMF 1101 may transmit, to the selected second NSACF 1104, a slice availability request message or a slice availability update request message. The second NSACF 1104 may include the UE 1100 in the number of currently registered UEs, based on the request of the AMF 1101. Descriptions about operations S1122 through S1126 are similar to those of FIGS. 7 and 8.

In operation S1128, the AMF 1101 may transmit the registration accept message to the UE 1100. The registration accept message may include the S-NSSAI and information about a newly assigned registration area. The S-NSSAI may be available for the UE 1100, and the S-NSSAI may be subject to NSAC so as counted in the number of registered UEs by the second NSACF 1104.

The NF taking charge of counting of the number of UEs using the same S-NSSAI with respect to the UE 1100 is changed from the first NSACF 1103 to the second NSACF 1104, and thus, information associated with the UE 1100, stored in the first NSACF 1103, may have to be deleted, and the number of currently registered UEs managed by the first NSACF 1103 may have to be reduced. These operations may be performed by using one (scheme A or scheme B) of two methods. According to scheme A, triggering is performed by the AMF 1101. According to scheme B, triggering is performed by the second NSACF 1104.

According to scheme A, the AMF 1101 may perform operations S1130 through S1134 to delete the information associated with the UE 1100, stored in the first NSACF 1103, and reduce the number of currently registered UEs managed by the first NSACF 1103. Operations S1130 through S1134 may correspond to the procedure of decreasing the number of registered UEs, described with respect to FIG. 8.

According to scheme B, the second NSACF 1104 may transmit a slice availability update request message to the first NSACF 1103 in operation S1140. The second NSACF 1104 may determine the first NSACF 1103 based on local configuration information stored in the second NSACF 1104. Alternatively, the second NSACF 1104 may determine the first NSACF 1103 based on the information received from the AMF 1101 in operation S1122. For example, a message of operation S1122 may include information about the first NSACF 1103 (an NF ID of the first NSACF 1103, or the like).

The slice availability update request message may include S-NSSAI, a UE ID, and information about a current AN of a UE (for example, 3GPP, N3GPP, or the like). In addition, the slice availability update request message may include an indicator indicating that the number of registered UEs has to be decreased.

In operation S1142, the first NSACF 1103 may update the number of currently accessed UEs of the received S-NSSAI. The method of updating the number of currently accessed UEs via the first NSACF 1103 in operation S1142 may correspond to the method of updating the number of accessed UEs described above with respect to FIG. 8.

The first NSACF 1103 updating the number of currently accessed UEs may transmit a slice availability update response message to the second NSACF 1104 in operation S1144.

Figure 12:
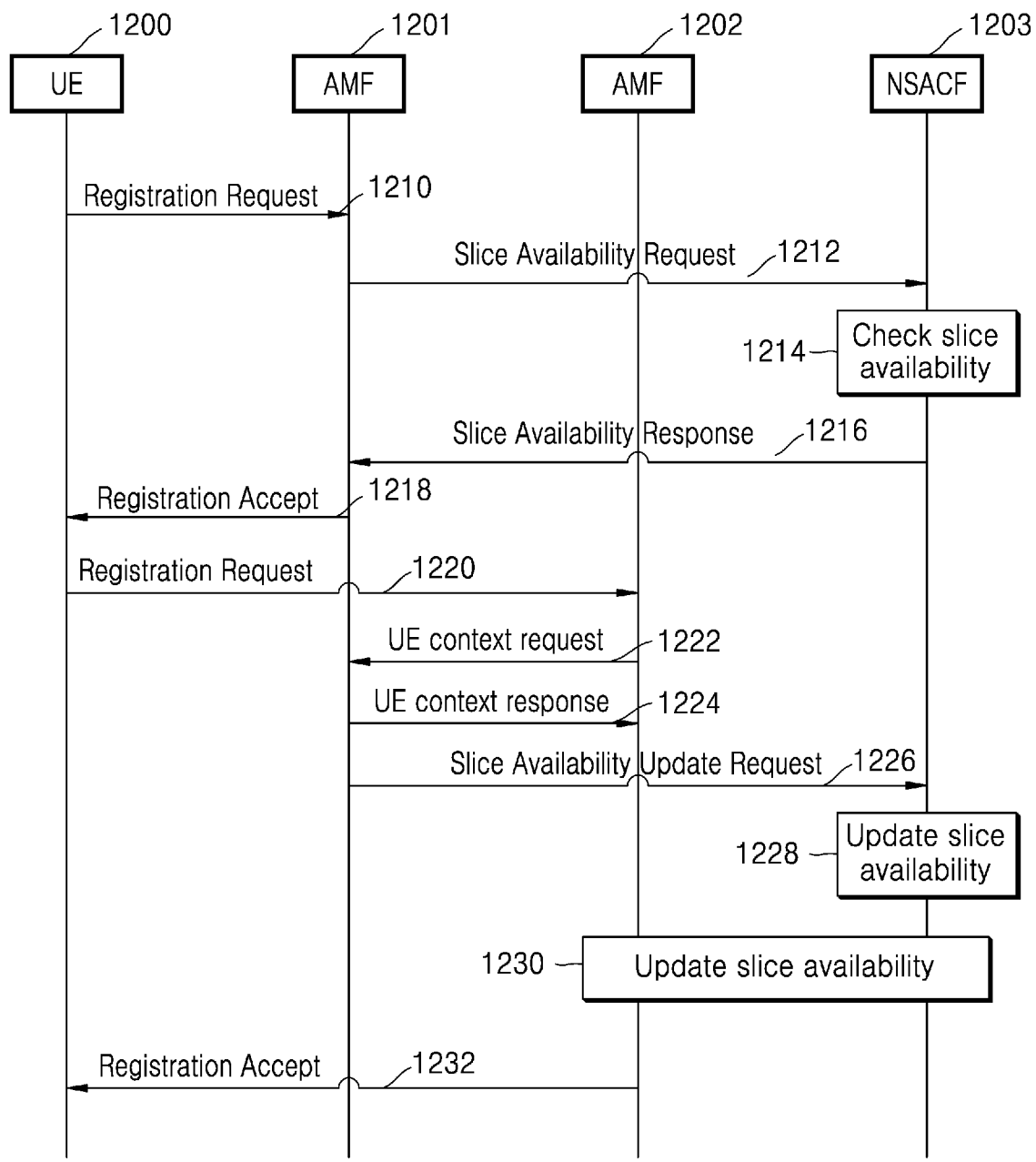
FIG. 12 is a diagram illustrating a procedure for updating an availability of a slice according to an embodiment of the disclosure.

FIG. 12 is a diagram illustrating a slice availability update procedure according to an embodiment of the disclosure.

Referring to FIG. 12, a UE 1200 may be registered in a network through operations S1210 through S1218, and an NSACF 1203 may include the UE 1200 in the number of currently registered UEs, based on a request of a first AMF 1201. Operations S1210 through S1218 may correspond to operations S1100 through S1118 of FIG. 11, respectively.

In operation S1220, the UE 1200 may transmit a registration request message to a second AMF 1202, for example, due to a movement/a change of location, or the like. In operation S1220, a location (a TAI) of the UE 1200 may not be included in a registration area received in operation S1218. A registration request message may include S-NSSAI. The S-NSSAI may be S-NSSAI included in a registration accept message of operation S1218. The second AMF 1202 may identify an old AMF previously accessed by the UE 1200, that is, the first AMF 1201, based on a UE ID (5G-GUTI) included in the registration request message.

In operation S1222, the second AMF 1202 may request, from the first AMF 1201, a UE context of the UE 1200 identified by the UE ID (SUPI or 5G-GUTI). The registration request message may include information of a current location (a TAI) of the UE 1200. In addition, the registration request message may include information about a service area (a list of TAIs) supported by the second AMF 1202.

In operation S1224, the first AMF 1201 may transmit the UE context of the UE 1200 to the second AMF 1202.

The first AMF 1201 may compare a serving area of the NSACF 1203 configured to manage the number of registered UEs 1200 in operations S1212 through S1216 with information about the current TAI of the UE 1200 and/or the service area (the list of TAIs) supported by the second AMF 1202, received in operation S1222. When the information about the current TAI of the UE 1200 or the service area (the list of TAIs) supported by the second AMF 1202 is not included in the serving area of the NSACF 1203, the first AMF 1201 may determine that it is needed to update the number of currently registered UEs of the NSACF 1203. For example, the first AMF 1201 may determine that the UE 1200 has moved out of the serving area of the NSACF 1203 and may determine to delete information about the UE 1200 stored in the NSACF 1203.

In operation S1226, the first AMF 1201 may transmit a slice availability update request message to the NSACF 1203. Operations S1226 through S1228 may correspond to operations S814 through S818 described above with reference to FIG. 8. In operation S1228, the NSACF 1203 may delete the information about the UE 1200 determined to have moved out of the serving area of the NSACF 1203 and may decrease the number of currently registered UEs.

The second AMF 1202 receiving the UE context in operation S1224 may continually perform a registration procedure through operations S1230 through S1232.

The second AMF 1202 may determine that the received S-NSSAI is subject to NSAC. In addition, the second AMF 1202 may select an NSACF based on the current location (TAI) of the UE and/or the registration area assigned by the second AMF 1202. In operation S1230, the second AMF 1202 may perform a network slice update procedure with the selected NSACF. Here, the selected NSACF may be the same as or different from an NSACF configured to perform operation S1214. Operation S1230 may correspond to the network slice update procedure described above with reference to FIG. 7.

In operation S1232, the second AMF 1202 may transmit a registration accept message to the UE 1200. The registration accept message may include the S-NSSAI.

A method and an apparatus for effectively managing a network slice (or network slicing) in a wireless communication system are disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a wireless communication system, the method comprising:
    transmitting, to a network slice admission control function (NSACF), a request message for a slice availability check including information regarding an access type of a user equipment (UE), based on a registration request of the UE for one or more single network slice selection assistance informations (S-NSSAIs);
    in response to the slice availability check being performed for the one or more S-NSSAIs, based on the access type of the UE at the NSACF, receiving a response message including information regarding a result of the slice availability check, from the NSACF; and
    transmitting a registration response for the one or more S-NSSAIs to the UE, based on the result of the slice availability check,
    wherein the slice availability check includes updating a number of UEs registered for the one or more S-NSSAIs, and
    wherein, in case that the UE is already counted for the one or more S-NSSAIs, the number of UEs registered for the one or more S-NSSAIs is not increased.

2. The method of claim 1, wherein the transmitting of the registration response comprises:
    in response to the information included in the response message indicating that a number of UEs registered for each of the one or more S-NSSAIs reaches to a maximum number for each of the one or more S-NSSAIs, transmitting the registration response including reject indication for the one or more S-NSSAIs.

3. The method of claim 1, wherein the transmitting of the registration response comprises:
    in response to the information included in the response message indicating that a number of UEs registered for some of the S-NSSAIs reaches to a maximum number for the some of the S-NSSAIs, transmitting the registration response including at least one of reject indication for the some of the S-NSSAIs or accept indication for allowed S-NSSAI among the S-NSSAIs.

4. An access and mobility management function (AMF) comprising:
    at least one processor coupled with a transceiver,
    wherein the at least one processor is configured to:
        transmit, to a network slice admission control function (NSACF), a request message for a slice availability check including information regarding an access type of a user equipment (UE), based on a registration request of the UE for one or more single network slice selection assistance informations (S-NSSAIs),
        in response to the slice availability check being performed for the one or more S-NSSAIs, based on the access type of the UE at the NSACF, receive a response message including information regarding a result of the slice availability check, from the NSACF, and
        transmit a registration response for the one or more S-NSSAIs to the UE, based on the result of the slice availability check,
    wherein the slice availability check includes updating a number of UEs registered for the one or more S-NSSAIs, and
    wherein, in case that the UE is already counted for the one or more S-NSSAIs, the number of UEs registered for the one or more S-NSSAIs is not increased.

5. The AMF of claim 4, wherein the at least one processor is further configured to:
    in response to the information included in the response message indicating that a number of UEs registered for each of the one or more S-NSSAIs reaches to a maximum number for each of the one or more S-NSSAIs, transmit the registration response including reject indication for the one or more S-NSSAIs.

6. The AMF of claim 4, wherein the at least one processor is further configured to:
    in response to the information included in the response message indicating that a number of UEs registered for some of the S-NSSAIs reaches to a maximum number for the some of the S-NSSAIs, transmit the registration response including at least one of reject indication for the some of the S-NSSAIs or accept indication for allowed S-NSSAI among the S-NSSAIs.

7. A network slice admission control function (NSACF) comprising:
    a transceiver; and
    at least one processor coupled with the transceiver,
    wherein the at least one processor is configured to:
        receive, from an access and mobility management function (AMF), a request message for a slice availability check including information regarding an access type of a user equipment (UE), based on a registration request of the UE for one or more single network slice selection assistance informations (S-NSSAIs),
        perform the slice availability check for the one or more S-NSSAIs, based on the access type of the UE, and
        transmit a response message including information regarding a result of the slice availability check, to the AMF, and
    wherein a registration response for the one or more S-NSSAIs is transmitted from the AMF to the UE, based on the result of the slice availability check,
    wherein the slice availability check includes updating a number of UEs registered for the one or more S-NSSAIs, and
    wherein, in case that the UE is already counted for the one or more S-NSSAIs, the number of UEs registered for the one or more S-NSSAIs is not increased.

8. The NSACF of claim 7, wherein, in case that a number of UEs registered for each of the one or more S-NSSAIs reaches to a maximum number for each of the one or more S-NSSAIs, the registration response includes a reject indication for the one or more S-NSSAIs.

9. The NSACF of claim 7, wherein, in case that a number of UEs registered for some of the S-NSSAIs reaches to a maximum number for the some of the S-NSSAIs, the registration response includes at least one of reject indication for the some of the S-NSSAIs or accept indication for allowed S-NSSAI among the S-NSSAIs.

10. A user equipment (UE) comprising:
at least one processor coupled with a transceiver,
wherein the at least one processor is configured to:
  transmit a registration request for one or more single network slice selection assistance informations (S-NSSAIs), and
  in response to a slice availability check for the one or more S-NSSAIs being performed at a network slice admission control function (NSACF), based on a request message for a slice availability check including information regarding an access type of the UE and a registration response for the one or more S-NSSAIs including information regarding a result of the slice availability check being received at an access and mobility management function (AMF), receive a registration response for the one or more S-NSSAIs from the AMF, based on the result of the slice availability check,
wherein the slice availability check includes updating a number of UEs registered for the one or more S-NSSAIs, and
wherein, in case that the UE is already counted for the one or more S-NSSAIs, the number of UEs registered for the one or more S-NSSAIs is not increased.

11. The UE of claim 10, wherein the at least one processor is further configured to:
in response to the information included in a response message indicating that a number of UEs registered for each of the one or more S-NSSAIs reaches to a maximum number for each of the one or more S-NSSAIs, receive the registration response including reject indication for the one or more S-NSSAIs.

12. The UE of claim 10, wherein the at least one processor is further configured to:
in response to the information included in a response message indicating that a number of UEs registered for some of the S-NSSAIs reaches to a maximum number for the some of the S-NSSAIs, receive the registration response including at least one of reject indication for the some of the S-NSSAIs or accept indication for allowed S-NSSAI among the S-NSSAIs.

* * * * *